April 27, 1965
A. A. NUDELL
3,180,383
DEVICE FOR HOLDING A RADISH DURING THE CUTTING
OF THE LATTER INTO THE FORM OF A ROSETTE
Filed June 7, 1963
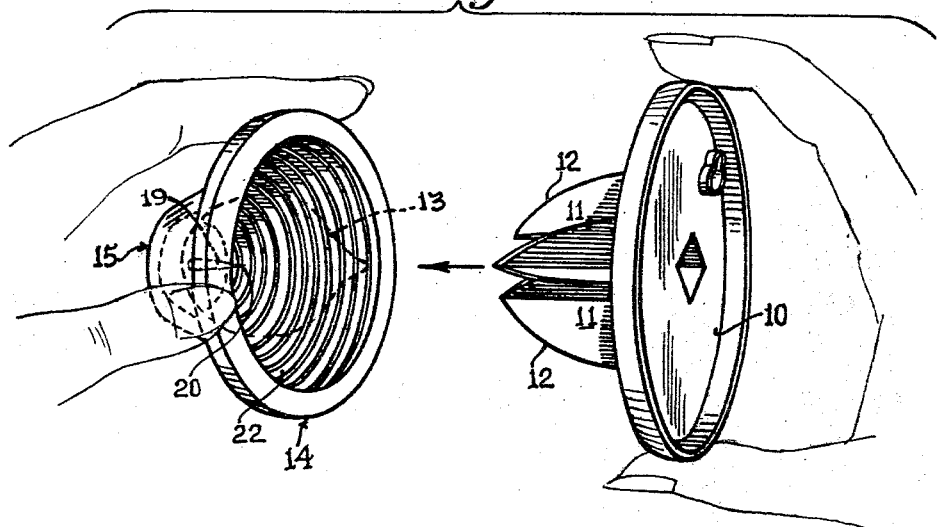
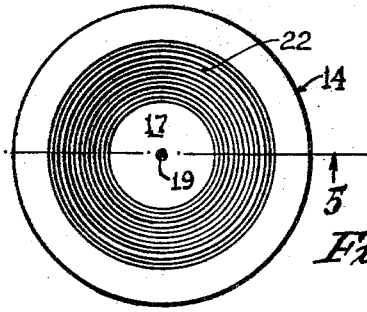
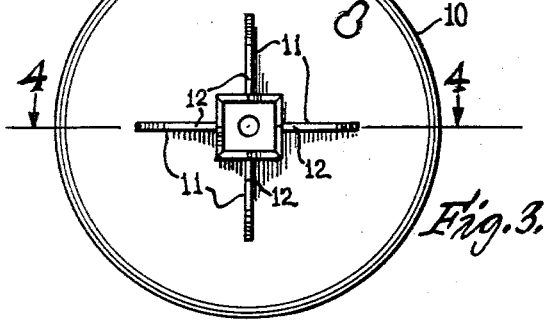
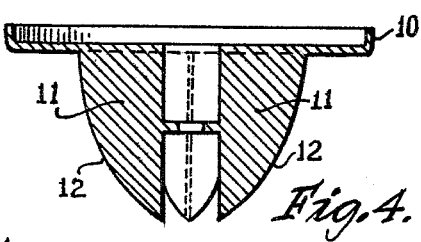
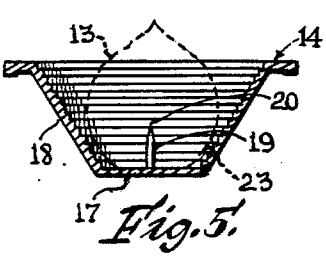
INVENTOR.
ARTHUR A. NUDELL
BY
O'Hredy & O'Hredy
HIS ATTORNEYS.

United States Patent Office 3,180,383
Patented Apr. 27, 1965

3,180,383
DEVICE FOR HOLDING A RADISH DURING THE CUTTING OF THE LATTER INTO THE FORM OF A ROSETTE
Arthur A. Nudell, Chicago, Ill., assignor to Nu-Dell Plastics Corporation, Chicago, Ill., a corporation of Illinois
Filed June 7, 1963, Ser. No. 286,295
1 Claim. (Cl. 146—203)

My invention relates to a simplified device for holding a radish during the cutting of the latter into the form of a rosette.

It has for its principal object the provision of an improved construction of this character which will effectively hold a radish in position to be operated upon by the cutter.

The radish cutter with which my improved holder is intended to be so associated is of the type which is held in one hand and brought down upon the radish. Due to the sharpness of the cutter blades of the radish cutter, the operation of cutting the radish into a design, such for example as a rosette, subjects the user to the danger of being cut.

It is therefore a principal object of this invention to provide a holder within which the radish to be cut is placed and retained therein while the cutter performs its operation of cutting the radish. By such a holder, the danger to the user of being cut will be in a large measure eliminated.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of my improved holder showing the same in relationship to a cutter;

FIG. 2 is a top plan view of the holder;

FIG. 3 is a bottom plan view of the cutter illustrated in FIG. 1;

FIG. 4 is a sectional detailed view taken substantially on line 4—4 of FIG. 3;

FIG. 5 is a sectional detailed view taken substantially on line 5—5 of FIG. 2; and FIG. 6 is a perspective view of the radish cut to simulate a rosette.

The several objects of my invention are accomplished by the preferred form of construction shown in the accompanying drawings and hereinafter described.

In FIGS. 1, 3 and 4, I have illustrated a radish cutter with which my improved holder is preferably used.

The radish cutter comprises a flanged disc 10 from one side of which extend a plurality of cutter blades or discs 11 each having a relatively sharp cutter edge 12. These cutting discs 11 are arranged radially with respect to each other and when operated to cut a radish, will result in cutting the radish 13 to simulate a rosette.

In the ordinary use of a cutter such as is illustrated in FIG. 1, the cutter is held in the hand and while the radish is held by the fingers of the other hand, the cutter is brought down upon the radish 13. Should the user's fingers accidentally come into contact with the cutter discs 11 during this cutting operation, or should the radish 13 slip or tilt while being held, there is a grave likelihood that the user will be injured.

To reduce this possibility to a minimum, I provide a holder 14. This holder 14 comprises a truncated body 15 by which is provided a concave well 16 and a flat bottom 17, the latter to facilitate placing the holder 14 on a flat support. The bottom wall 17 is preferably formed integral with the conical side walls 18 of the body 15 defining the well 16.

The bottom wall 17 has an upstanding centrally located shaft 19 sharply pointed as at 20. Surrounding the top edge of the walls 18 and formed integral therewith is a holder flange which, when the holder is in use, is held by the fingers as shown in FIG. 1.

To complete the invention, the side walls 18 are internally knurled circumferentially as at 22.

The holder may be of unitary structure molded of suitable commercial plastic. In use, a radish is impaled upon the shaft 19 as shown in FIG. 5. The lower portion 23 of the radish will be pressed against the adjacent knurled surface 22 which, together with the shaft 19, will hold the radish 13 in an upright position within the well 16. The holder 14 may be either placed upon a flat surface as shown in FIG. 5 or held by the fingers of the hand as shown in FIG. 1, with the radish exposed in the direction from within the well 16. The cutter 10 which is held in the other hand is now pressed upon the radish, the cutter discs 11 cutting the radish into the desired rosette design. By the use of a holder, such as 14, it is manifest that the cutting of the radish is made simpler and with safety. By forming the well concave as shown, the holder may receive radishes of various sizes.

From the foregoing, it will be clear as to the usefulness of my improved holder. As the holder is of simple construction it may be economically manufactured.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claim.

Having thus described my invention, what I claim as new and desire to protect by Letters Patent is:

An article of manufacture for holding and cutting a radish into the form of a rosette comprising a radish holder having a molded body including a laterally extending peripheral holding flange and a conical-truncated shaped well within which the radish to be cut is placed, the inner wall surface of said well being concentrically knurled so as to securely hold therein radishes of different sizes, a pointed shaft within said well and extending upwardly from the bottom wall thereof and upon which the radish to be cut is impaled, a cutter having a circular body equal in size to the diameter of said holding flange of said body and adapted to be placed in confronting relation thereon when cutting a radish into the form of a rosette, said cuter having a plurality of laterally extending blades, the outer side edges of which are concaved so as to conform to the knurled inner wall surface of said well when inserted therein to form a radish into a rosette.

References Cited by the Examiner
UNITED STATES PATENTS

| 693,284 | 2/02 | Lemon | 294—5 |
| 886,510 | 5/08 | Huguet | 294—5 |
| 1,697,809 | 1/29 | Cherry | 146—218 |
| 1,717,644 | 6/29 | Wolverton | 146—216 |
| 2,630,850 | 3/53 | Elsaesser | 146—203 X |
| 3,092,409 | 6/63 | Murray | 146—2 X |

J. SPENCER OVERHOLSER, *Primary Examiner.*